(12) United States Patent
Juedes

(10) Patent No.: US 6,619,698 B2
(45) Date of Patent: *Sep. 16, 2003

(54) HOSE FITTING AND DIE FOR PREPARATION

(75) Inventor: Marvin A. Juedes, Two Rivers, WI (US)

(73) Assignee: Formrite Companies, Inc., Two Rivers, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/923,885

(22) Filed: Aug. 7, 2001

(65) Prior Publication Data

US 2002/0089180 A1 Jul. 11, 2002

Related U.S. Application Data

(63) Continuation of application No. 09/004,669, filed on Jan. 8, 1998, now Pat. No. 6,270,126.

(51) Int. Cl.[7] .............................................. F16L 33/00
(52) U.S. Cl. ...................................... 285/246; 285/256
(58) Field of Search ................................ 285/246, 245, 285/256

(56) References Cited

U.S. PATENT DOCUMENTS

| | | | |
|---|---|---|---|
| 1,204,352 A | 11/1916 | Hachmann | |
| 3,017,203 A | 1/1962 | Macleod | |
| 3,433,505 A | * 3/1969 | Weatherhead, III | ..... 285/256 X |
| 4,513,497 A | 4/1985 | Finch | |
| 4,702,501 A | 10/1987 | McLennan | |
| 4,773,679 A | 9/1988 | Hangebrauck | |
| 5,009,002 A | 4/1991 | Kelly | |
| 5,043,576 A | 8/1991 | Broadhurst et al. | |
| 5,054,819 A | 10/1991 | Grunwald | |
| 5,062,199 A | 11/1991 | Kelly | |
| 5,333,775 A | 8/1994 | Bruggemann et al. | |
| 5,387,016 A | * 2/1995 | Joseph et al. | ........... 285/256 X |
| 5,445,001 A | 8/1995 | Snavely | |
| 5,471,857 A | 12/1995 | Dickerson | |
| 5,485,737 A | 1/1996 | Dickerson | |
| 5,557,961 A | 9/1996 | Ni et al. | |
| 5,644,829 A | 7/1997 | Mason et al. | |
| 6,270,126 B1 | * 8/2001 | Juedes | ........................ 285/246 |

FOREIGN PATENT DOCUMENTS

| | | |
|---|---|---|
| JP | 5-118483 | 5/1993 |
| WO | 97/10907 | 3/1997 |

OTHER PUBLICATIONS

SAE Fluid Conductors and Connectors Standards Manual, 1997, ed., SAE HS–150, Society of Automotive Engineers, Inc., Warrendale PA, pp. 293–412 and 549–552.*

* cited by examiner

Primary Examiner—Greg Binda
(74) Attorney, Agent, or Firm—Reinhart Boerner Van Deuren, sc

(57) ABSTRACT

A system and method for hydroforming hose fittings for use with hose assemblies.

9 Claims, 2 Drawing Sheets

HOSE FITTING AND DIE FOR PREPARATION

This application is a continuation application of application Ser. No. 09/004,669 filed on Jan. 8 1998, which issued as U.S. Pat. No. 6,270,126 on Aug. 7, 2001.

BACKGROUND OF THE INVENTION

This invention relates generally to a hose assembly employing a hydroformed hose fitting, and more particularly, to an improved hydroforming system and method of using a die to hydroform a hose fitting.

Hydroforming, sometimes referred to as fluid forming, was developed during the late 1940s-early 50s in response to a need for a more efficient, cost-effective method of producing metal parts. As a general principle, hydroforming involves application of a predetermined fluid pressure to an area of metal surface to be manipulated. Where the metal surface is a tube, an internal fluid pressure is applied as the tube is bent and stretched. Generally, hydroformation of a tube can be accomplished by filling the tube interior with the fluid, retaining it therein and increasing the internal pressure. Depending upon the die tool utilized, hydroforming can also be used to radially expand the tube.

Specific advantages of hydroforming include: relatively inexpensive tooling, the availability of complex shapes and contours, minimal material thinout (hydroforming flows the metal rather than stretching it—thinout is usually less than 10%), reduced finishing costs (by comparison, matched die methods of formation can cause scuff marks, shock and stretch lines), and precision with difficult configurations even where high tolerances are required.

Typically, fittings manufactured for use in conjunction with hose assemblies are machined at considerable expense. Where a one-piece machined fitting is not available or is uneconomical, a brazing procedure can be utilized to provide the desired fitting from two components. Inherently, brazing provides a structural weakness which may manifest itself through failure upon application of routine pressure forces. Where one-piece fittings can be machined, they are difficult to bend if a curved configuration is required. Even so, bending introduces material weaknesses and increases the potential for failure at application pressures.

There are a considerable number of problems and deficiencies relating to the manufacture of hose fittings and, subsequently, assemblies with such fittings. The search for a cost-efficient and effective alternative to machining has been an on-going concern in the art. There is a need for a system/method, hose fitting and/or assembly which takes advantage of the manufacturing and commercial benefits typically associated with hydroforming.

OBJECTS OF THE INVENTION

It is an object of this invention to overcome the problems and shortcomings of the prior art, including those described above. Another object of this invention is to provide a hose assembly prepared using a hydroforming process.

It is another object of the present invention to provide a one-piece hose fitting which is formed unitarily, without brazing, to maintain structural integrity.

It is an object of this invention to provide a fitting meeting pertinent industry dimensional, design and/or performance specifications or their equivalents, such a fitting as can be hydroformed and/or used in conjunction with a hose assembly also meeting or equivalent to such underlying specifications.

It is an object of this invention to provide a system for hydroforming, unitarily, a one-piece hose fitting, such a system as can include a die tool and/or a set of dies, as can be used to hydroform a fitting meeting or equivalent to various industry specifications.

It is an object of the present invention to provide a system having an interchangeable die tool and/or dies such that hose fittings of variable design and dimension can be hydroformed from tubular stock.

It is an object of this invention to provide a system and/or method for hydroforming a hose fitting for use in conjunction with a securing mechanism, such that a hose can be assembled with such a fitting.

It is an object of this invention to provide a metallic hose fitting hydroformed such that the fitting is substantially free of machine lines, scuff marks and related surface deformities typically observed as a result of machining or related mechanical/grinding procedures, and substantially without material thinning, allowing for a degree of thinning inherent to hydroforming processes.

It is an object of this invention to provide a hose fitting, assembly, system and/or method obviating the costly finishing work on the hose fitting.

It will be understood by those skilled in the art that one or more aspects of this invention can meet certain objects, while one or more other aspects can meet certain other objectives. Each objective may not apply equally, in all instances, to every aspect of this invention. As such, the following objects—in light of the prior art regarding hose assemblies, hose fittings and methods for their preparation—can be viewed in the alternative with respect to any one aspect of the present invention.

Other objects, features and advantages of the present invention will be apparent from the following summary and description of preferred embodiments, and as such, will be readily apparent to those skilled in the art having knowledge of various hose fittings, assemblies and the requirements for their use in trade and industry. Such objects, features, benefits and advantages will be apparent from the above as taken in conjunction with the accompanying examples, tables, data, figures and all reasonable inferences to be drawn therefrom.

SUMMARY OF THE INVENTION

This invention includes an improved hose fitting, as well as an assembly for use therewith, together with a system and/or method of preparing such. The invention overcomes certain well-known problems and deficiencies, including those outlined above, while providing a cost-effective alternative to current manufacturing and machining operations.

In part, the present invention is a hose assembly, including: (1) a unitary hose fitting hydroformed from a tube and (2) a hose functionally and dimensionally compatible with the hose fitting. Consistent with the benefits available through hydroforming but heretofore unrealized in the context of a hose fitting, application of internal tubular pressure results in a number of structural characteristics not available through use of the prior art, including metal flow without stretching or substantially thinning the metal. In such a way, a one-piece fitting can be unitarily prepared without brazing and without lines or scuff marks or other surface imperfections typically resulting from a machining operation. At least a barb can be incorporated into the fitting configuration, such that the hose component mates with the fitting and engages a barb incorporated therein.

In preferred embodiments, the hydroformed hose fitting has at least one portion for attachment of a securing mechanism. In such an embodiment, the assembly also includes a mechanism to secure the hose to the fitting. In preferred embodiments and without limitation, the mechanism can be a ferrule or a clamp. While screw style fittings may be less preferred for certain assemblies or uses, such can also be hydroformed in accordance with this invention providing measures are taken to maintain structural integrity about the thread portion. See, for instance, U.S. Pat. No. 5,333,775 referenced below.

Likewise, in preferred embodiments, the hydroformed fitting of the assembly has dimensional and performance properties selected from, among other properties, dimensional and performance properties either meeting or equivalent to Society of Automotive Engineers (SAE) J516 standard specifications for hydraulic hose fittings. In a similar fashion, preferred embodiments of the present assembly include those where the hose component has dimensional and performance properties selected from those dimensional and performance properties either meeting or equivalent to SAE J517 standard specifications for hydraulic hoses. Such standard specifications for hydraulic hose and hose fittings, as well as other hose and fitting components, are well-known to those skilled in the art, but heretofore have not been utilized in conjunction with hydroformed hose fittings, assemblies or their manufacture. Incorporation of such standard specifications will be well-known to those skilled in the art made aware of this invention.

The compatibility of the hose component with the inventive fitting of this invention can be in accordance with SAE recommended practice J1273. In particular, pursuant to recommended practice under SAE J 1273, the pressure of an assembly system must first be determined. Hose selection is then made so that the recommended maximum operating pressure is equal to or greater than the system pressure. Surge pressure higher than the maximum operating procedure will tend to shorten applicable hose life; accordingly, such pressures must be taken into account in determining compatibility. Other factors include, without limitation: suction (negative pressure), temperature of a fluid passed through the hose, fluid compatibility with the hose and fittings, size of the components as compared to the pressure and rate of flow of the pressurized fluid, the environment (ultraviolet light, ozone, salt water, chemicals, etc.) which can cause degradation, mechanical loads (induced by flexing, twisting, etc.), abrasion and electrical conductivity. Such factors and other related considerations are well-known to those skilled in the art and will be understood as applicable to the present hydroformed hose fittings and their use with hose assemblies, as those individuals are made aware of this invention.

Other preferred embodiments of the assembly of this invention include those where multiple barbs are provided on the fitting component. Such barbs can have a variety of configurations, including, without limitation, circumferential edges, squares, beads or a combination of such configurations. Likewise, in preferred embodiments, the fitting of this invention has a uniform wall thickness dimension. Even so, where variations are required, such can be introduced by hydroforming the fitting in accordance with the methods and procedures described in U.S. Pat. No. 5,333,775, the entirety of which is incorporated herein by reference.

In part, the present invention is an improved hydroforming system. The improvement includes first and second opposed dies removably engaging one another and defining a cavity for placement of tubular stock. Each die has at least one concave portion, and the concave portions are arranged to define a cavity having the design and outer dimensions of a hose fitting. In preferred embodiments, the dies are configured such that the cavity has a design and dimensions meeting SAE J516 standard specifications for hydraulic hose fittings, or a design and dimensions equivalent to such standard specifications. In preferred embodiments, the cavity has a concave portion so as to provide a hose fitting with a configuration engageable with a ferrule. In a similar fashion, with or without such a configuration, a preferred embodiment provides a cavity having a concave portion to provide at least one hose barb on the resultant fitting.

In part, the present invention can be made using a die to manufacture a hose fitting. As described more fully above, such a fitting has a configuration suitable for use with a hose assembly. The invention can be made by: (1) providing a metallic tube, (2) providing a die tool to engage the tube and defining a shaped cavity, (3) contacting the interior of the tube with an expansive material and retaining the material within the tube, (4) increasing the pressure of the expansive material on the tube interior to a predetermined level sufficient to flow the metal component of the tube, and (5) engaging the tube with the aforementioned die tool to form a hose fitting.

As can be utilized with the present invention, a tubular blank is filled with a hydroforming fluid, by introduction to a fluid bath, injection or placement of the fluid therein. The ends of the tube can be plugged to retain the fluid within the tube, with the internal pressure thereafter increased to a desired level according to techniques known to those skilled in the art. Either sequentially or contemporaneously therewith, the die tool is brought into engagement with the tube to hydroform a hose fitting having an external configuration and set of outer dimensions defined by and/or corresponding to the shaped cavity. Mechanical components usable with the present method are well-known, as illustrated by the description provided in U.S. Pat. No. 5,471,857 which is incorporated herein in its entirety.

In preferred embodiments, engagement of the die tool with a pressurized tube provides a hose fitting with a design and dimensions selected from a group of properties meeting SAE J516 standard specifications for hydraulic hose fittings or, without limitation, properties equivalent to such standard specifications. Alternatively or in conjunction therewith, the engagement results in a dimensional configuration providing a mating relationship with a ferrule.

The present invention can be made utilizing a hydraulic fluid. In preferred embodiments, such a fluid is a hydraulic oil of the sort which can be used in hydroforming operations of the prior art. In other embodiments, various other expansive materials can be used, as would be well-known to those individuals skilled in the art and made aware of this invention. Such expansive materials include, without limitation, urethane and an explosive. Regardless of the identity or nature of the expansive material, internal pressures of the sort useful with the present invention are preferably at least about 55,000 psi. Various other pressures and method parameters can be utilized, as required by the particular hose fitting hydroformed and as would be well-known to those skilled in the art having knowledge that such articles can be hydroformed.

DETAILED DESCRIPTION OF PREFERRED EMBODIMENTS

Figure 1:
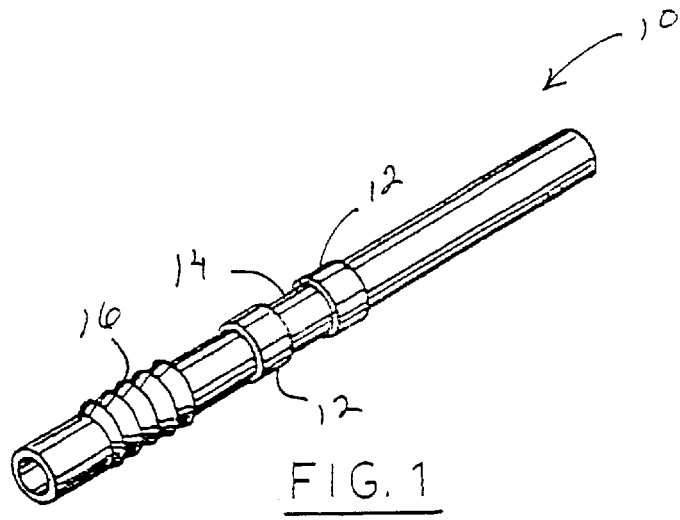
FIG. 1 is a perspective view of a hose fitting, in accordance with this invention.
Figure 2:
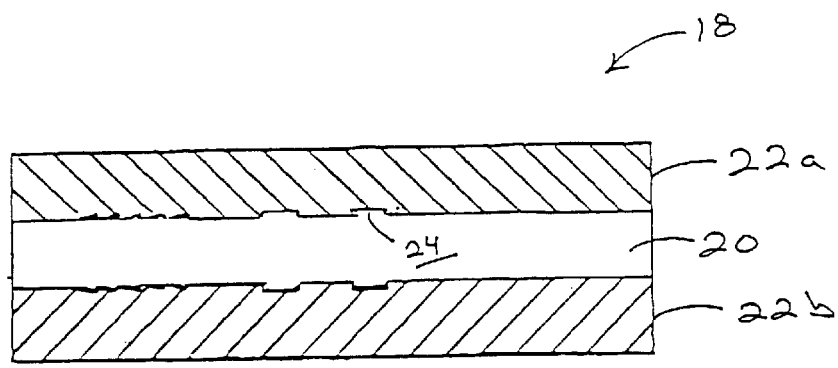
FIG. 2 is a schematic view of a die tool configured with a cavity corresponding to the outer dimensions of the fitting of FIG. 1.

Fitting 10 can be hydroformed from tubular metal stock using die tool 18 defining cavity 20, as shown in the cross sectional view provided by FIG. 2. In preferred embodiments, die tool 18 can comprise first and second opposed dies, 22*a* and 22*b*, respectively. Cavity 20 includes at least one concave portion 24. As shown in FIG. 2, the indicated portion defines the design and outer dimensions of one portion 12 of fitting 10.

Figure 3:
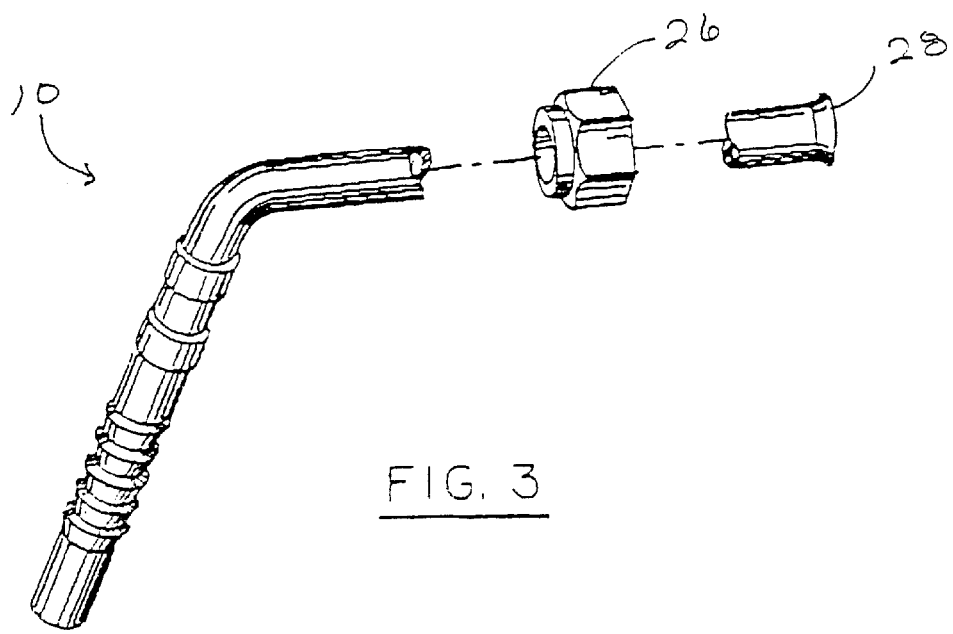
FIG. 3 is a perspective partially exploded view of a fitting, of the female 37-degree flared type, in accordance with this invention and SAE standard specification J516.

As illustrated in FIG. 3, metal fitting 10 can be angled and/or further manipulated after hydroforming. Hydroformed metal fitting 10 can be passed through threaded nut 26 either before or after the angle shown is introduced. Edge 28 is then flared to retain nut 26 along fitting 10.

Figure 4:
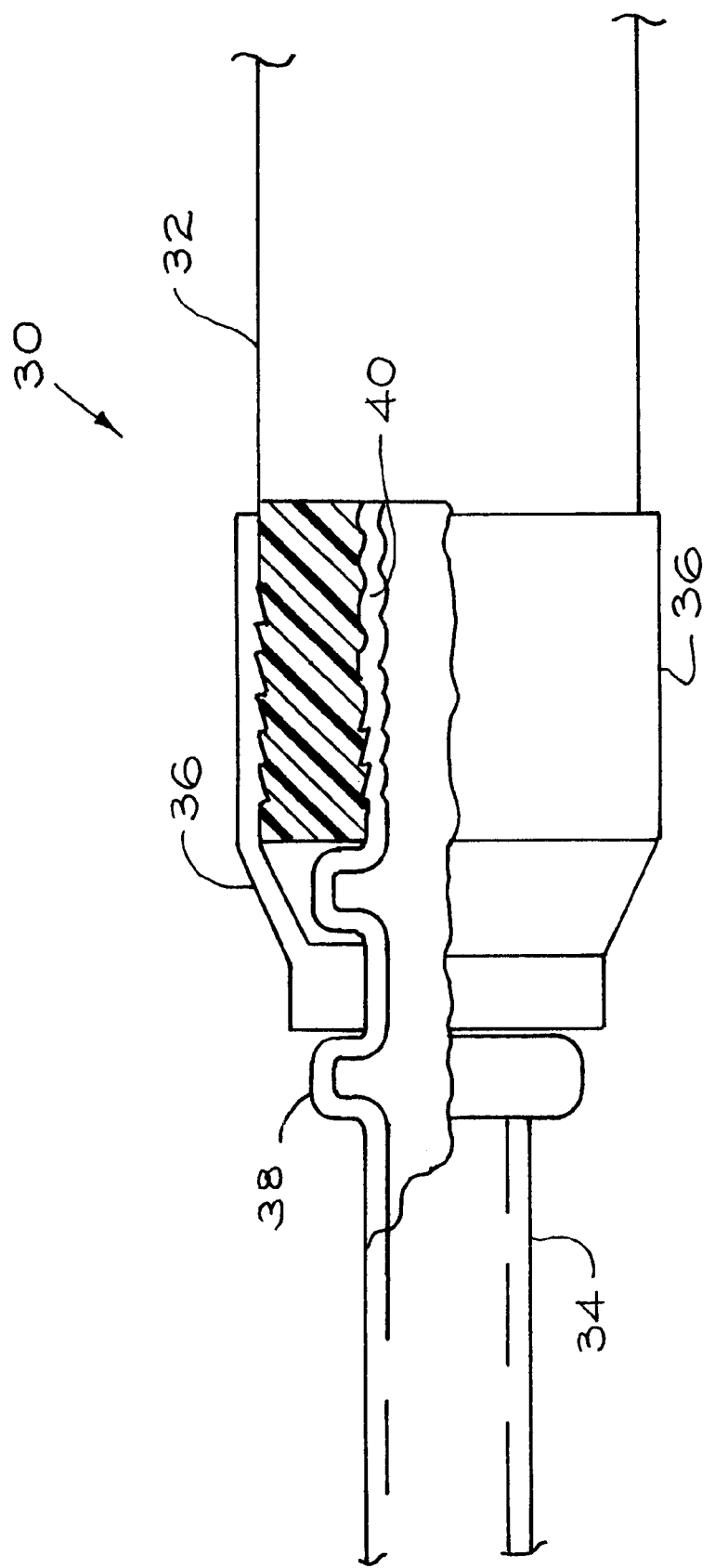
FIG. 4 is a partial fragmentary view of a hose assembly, in accordance with this invention.

A hose assembly, in accordance with this invention, is illustrated by the partial fragmentary view provided in FIG. 4. Assembly 30 includes hose 32 in conjunction with fitting 34 and secured thereto by mechanism 36. The mating relationship of mechanism 36 and raised portion 38 of fitting 34, together with the grasping action of barbs 40, assure proper function of assembly 30. A number of barb configurations are shown in FIG. 4, starting from left to right: sharp edged, square and beaded. Typically, one circumferential barb configuration will be utilized; however, a combination of barbs can be used with good effect.

With reference to FIG. 4, a hose assembly comprises a unitary hose fitting of hydroformed metal, hydroformed from a metal tube. The fitting of such an assembly is substantially without brazing and without a machine line. The fitting is made without substantial thinning of the metal, such that the fining is substantially unthinned and has a uniform wall thickness dimension.

EXAMPLES OF THE INVENTION

The following non-limiting examples and data illustrate various aspects and features relating to the method, system and resulting fittings and assemblies of this invention, including the surprising and unexpected manufacture of hose fittings using hydroforming technologies.

Examples 1–17, below, illustrate hoses of the sort which can be used in conjunction with the fittings and/or assemblies of this invention. The dimensional and design parameters of such hoses will be well known to those skilled in the art made aware of this invention. For instance, the hoses of examples 1–17 are the well-known SAE 100R series hoses (SAE 100R1, etc.), the dimensional and design parameters of which can be found in SAE standard J517. Various performance specifications for such SAE 100R1–15 hoses are also well-known, some of which are summarized in Tables 1a-b through 3a-b.

Example 1

Steel Wire Reinforced, Rubber Covered Hydraulic Hose (SAE 100R1). A hose for use with petroleum base hydraulic fluids within a temperature range of −40 to +100° C., and with various water base hydraulic fluids. A hose in accordance with this example can have an inner tube of oil-resistant synthetic rubber, a single wire braid reinforcement, and an oil- and weather-resistant synthetic rubber cover. A ply or braid of suitable material may be used over the inner tube and/or over the wire reinforcement to anchor the synthetic rubber to the wire. Alternatively, the same hose may have a cover designed to assemble with fittings which do not require removal of the cover or a portion thereof.

Example 2

High-Pressure, Steel Wire Reinforced, Rubber Covered Hydraulic Hose (SAE 100OR2). A hose for use with petroleum base hydraulic fluids within a temperature range of −40 to +100° C., and with various water base hydraulic fluids. A hose in accordance with this example can have an inner tube of oil-resistant synthetic rubber, steel wire reinforcement and an oil- and weather-resistant synthetic rubber cover. A ply or braid of suitable material may be used over the inner tube and/or over the wire reinforcement to anchor the synthetic rubber to the wire. Construction variations consist with this invention are further referenced in SAE Standard J517.

Example 3

Double Fiber Braid (Nonmetallic), Rubber Covered Hydraulic Hose (SAE 100OR3). A hose for use with petroleum base hydraulic fluids within a temperature range of −40 to +100° C., and with various water base hydraulic fluids. A hose in accordance with this example can have an inner tube of oil-resistant synthetic rubber, two braids of suitable textile yarn, and an oil- and weather-resistant synthetic rubber cover.

Example 4

Wire Inserted Hydraulic Suction Hose (SAE 100R4). A hose for use in low pressure and vacuum applications with petroleum base hydraulic fluids within a temperature range of −40 to +100° C., and with various water base hydraulic fluids. A hose in accordance with this example can have an inner tube of oil-resistant synthetic rubber, a reinforcement consisting of a ply or plies of woven or braided textile fibers with suitable spiral of body wire, and an oil- and weather-resistant synthetic rubber cover.

Example 5

Single Wire Braid, Textile Covered Hydraulic Hose (SAE 100R5). A hose for use with petroleum base hydraulic fluids within a temperature range of −40 to +100° C., and with various water base hydraulic fluids. A hose in accordance with this example can have an inner tube of an oil-resistant synthetic rubber and two textile braids separated by a high tensile steel wire braid. All braids are impregnated with an oil- and mildew-resistant synthetic rubber compound.

Example 6

Single Fiber Braid (Nonmetallic), Rubber Covered Hydraulic Hose (SAE 100R6). A hose for use with petroleum base hydraulic fluids within a temperature range of −40 to +100° C., and with various water base hydraulic fluids. A hose in accordance with this example can have an inner tube of oil-resistant synthetic rubber, and one braided ply of suitable textile yarn, and an oil- and weather-resistant synthetic rubber cover.

Example 7

Thermoplastic Hydraulic Hose (SAE 100R7). A thermoplastic hose for use with petroleum base and synthetic hydraulic fluids within a temperature range of −40 to +93° C., and with various water base hydraulic fluids. A hose in accordance with this example can have a thermoplastic inner tube resistant to hydraulic fluids with suitable synthetic fiber reinforcement and a hydraulic fluid- and weather-resistant thermoplastic cover. Such a nonconductive hose should be identified with an orange cover and an appropriate lay line, in accordance with Federal Standard 595A. Such a hose is available for use in applications where there is the potential of contact with high voltage sources.

Example 8

High-Pressure Thermoplastic Hydraulic Hose (SAE 100R8). A thermoplastic hose for use with petroleum base and synthetic hydraulic fluids within a temperature range of −40 to +93° C., and with various water base hydraulic fluids. A hose in accordance with this example can have a thermoplastic inner tube consistent to hydraulic fluids with suitable synthetic fiber reinforcement and a hydraulic fluid- and weather-resistant thermoplastic cover. Such a nonconductive hose, as with the hose of the preceding example, should be identified with an orange cover and an appropriate lay line, in accordance with Federal Standard 595A. Again, such a hose is available for use in applications where there is the potential of contact with high voltage sources.

Example 9

High-Pressure, Four-Spiral Steel Wire Reinforced, Rubber Covered Hydraulic Hose (SAE 100R9). A hose for use with petroleum base fluids within a temperature range of −40 to +100° C., and with various water base hydraulic fluids. A hose in accordance with this example can have an inner tube of oil-resistant synthetic rubber, four-spiral plies of wire wrapped in alternating directions, and an oil- and weather-resistant synthetic rubber cover. A ply or braid of suitable material may be used over the inner tube and/or over the wire reinforcement to enter the synthetic rubber to the wire. Alternatively, such a hose can have a cover designed to assemble with fittings which do not require removal of the cover or a portion thereof.

Example 10

Heavy-Duty, Four-Spiral Steel Wire Reinforced, Rubber Covered Hydraulic Hose (SAE 100R10). A section covers hose for use with petroleum base fluids within a temperature range of −40 to +100° C., and with various water base hydraulic fluids. A hose in accordance with this example can have an inner tube of oil-resistant synthetic rubber, four-spiral plies of heavy wire wrapped in alternating directions, and an oil- and weather-resistant synthetic rubber cover. A ply or braid of suitable material may be used over the inner tube and/or over the wire reinforcement to anchor the synthetic rubber to the wire. Alternatively, such a hose has a cover designed to assemble with fittings which do not require removal of the cover or a portion thereof.

Example 11

Heavy-Duty Six-Spiral Steel Wire Reinforced, Rubber Covered Hydraulic Hose (SAE 100R11). A hose for use with petroleum base fluids within a temperature range of −40 to +100° C., and with various water base hydraulic fluids. A hose in accordance with this example can have an inner tube of oil-resistant synthetic rubber, six-spiral plies of wire wrapped in alternating directions, and an oil- and weather-resistant synthetic rubber cover. A ply or braid of suitable material may be used over the inner tube and/or over the wire reinforcement to anchor the synthetic rubber to the wire.

Example 12

Heavy-Duty, High Impulse, Four-Spiral Wire Reinforced, Rubber Covered Hydraulic Hose (SAE 100R12). A hose for use with petroleum base fluids within a temperature range of −40 to +121° C., and with various water base hydraulic fluids. A hose in accordance with this example can have an inner tube of oil-resistant synthetic rubber, four-spiral plies of wire wrapped in alternating directions, and an oil- and weather-resistant synthetic rubber cover. A ply or braid of suitable material may be used over or within the inner tube and/or over the wire reinforcement to anchor the synthetic rubber to the wire.

Example 13

Heavy-Duty, High Impulse, Multiple Spiral Wire Reinforced, Rubber Covered Hydraulic Hose (SAE 100R13). A hose for use with petroleum base fluids within a temperature range of −40 to +121° C., and with various water base hydraulic fluids. A hose in accordance with this example can have an inner tube of oil-resistant synthetic rubber, multiple-spiral plies of heavy wire wrapped in alternating directions and an oil- and weather-resistant synthetic rubber cover. A ply or braid of suitable material may be used over or within the inner tube and/or over the wire reinforcement to anchor the synthetic rubber to the wire.

Example 14

PTFE Lined Hydraulic Hose (SAE 100R14). A hose for use with petroleum base and synthetic base hydraulic fluids within a temperature range of −54 to +204° C., and with various water base hydraulic fluids. A hose in accordance with this example can have an inner tube of polytetrafluoroethylene (PTFE), reinforced with a single blade of 303XX Series stainless steel. Alternatively, such a hose may have the additional feature of an electrical conductive inner surface to preclude build-up of electrostatic charge.

TABLE 1a

SUMMARY OF SAE J517 100R-SERIES HOSE
MAXIMUM OPERATING PRESSURE $$\frac{\text{MPa}}{\text{PSI}}$$

| Nominal Hose I.D. Size, in | 100R1 | 100R2 | 100R3 | 100R4 | 100R5 | 100R6 | 100R7 |
|---|---|---|---|---|---|---|---|
| 1/8 | | | | | | | |
| 3/16 | 20.7/3000 | 34.5/5000 | 10.3/1500 | | 20.7/3000 | 3.4/500 | 20.7/3000 |
| 1/4 | 19.0/2750 | 34.5/5000 | 8.6/1250 | | 20.7/3000 | 2.8/400 | 19.0/2750 |
| 5/16 | 17.2/2500 | 29.3/4250 | 8.3/1200 | | 15.5/2250 | 2.8/400 | 17.2/2500 |
| 3/8 | 15.5/2250 | 27.6/4000 | 7.8/1125 | | | 2.8/400 | 15.5/2250 |
| 13/32 | 15.5/2250 | | | | 13.8/2000 | | |
| 1/2 | 13.8/2000 | 24.1/3500 | 6.9/1000 | | 12.1/1750 | 2.8/400 | 13.8/2000 |
| 5/8 | 10.3/1500 | 19.0/2750 | 6.0/875 | | 10.3/1500 | 2.4/350 | 10.3/1500 |
| 3/4 | 8.6/1250 | 15.5/2250 | 5.2/750 | 2.1/300 | | 2.1/300 | 8.6/1250 |
| 7/8 | 7.8/1125 | 13.8/2000 | | | 5.5/800 | | |
| 1 | 6.9/1000 | 13.8/2000 | 3.9/565 | 1.7/250 | | | 6.9/1000 |
| 1 1/8 | | | | | 4.3/625 | | |
| 1 1/4 | 4.3/625 | 11.2/1625 | 2.6/375 | 1.4/200 | | | |
| 1 3/8 | | | | | 3.4/500 | | |
| 1 1/2 | 3.4/500 | 8.6/1250 | | 1.0/150 | | | |
| 1 13/16 | | | | | 2.4/350 | | |
| 2 | 2.6/375 | 7.8/1125 | | 0.7/100 | | | |
| 2 3/8 | | | | | 2.4/350 | | |
| 2 1/2 | | 6.9/1000 | | 0.4/62 | | | |
| 3 | | | | 0.4/56 | 1.4/200 | | |

TABLE 1a-continued

SUMMARY OF SAE J517 100R-SERIES HOSE
MAXIMUM OPERATING PRESSURE $$\frac{\text{MPa}}{\text{PSI}}$$

| Nominal Hose I.D. Size, in | 100R1 | 100R2 | 100R3 | 100R4 | 100R5 | 100R6 | 100R7 |
|---|---|---|---|---|---|---|---|
| 4 | | | | 0.2 / 35 | | | |

TABLE 1b

SUMMARY OF SAE J517 100R-SERIES HOSE
MAXIMUM OPERATING PRESSURE $$\frac{\text{MPa}}{\text{PSI}}$$

| Nominal Hose I.D. Size, in | 100R8 | 100R9 | 100R10 | 100R11 | 100R12 | 100R13 | 100R14 |
|---|---|---|---|---|---|---|---|
| 1/8 | | | | | | | 10.3 / 1500 |
| 3/16 | 34.5 / 5000 | | 68.9 / 10000 | 86.2 / 12500 | | | 10.3 / 1500 |
| 1/4 | 34.5 / 5000 | | 60.3 / 8750 | 77.6 / 11250 | | | 10.3 / 1500 |
| 5/16 | | | | | | | 10.3 / 1500 |
| 3/8 | 27.6 / 4000 | 31.0 / 4500 | 51.7 / 7500 | 68.9 / 10000 | 27.6 / 4000 | | 10.3 / 1500 |
| 13/32 | | | | | | | 6.9 / 1000 |
| 1/2 | 24.1 / 3500 | 27.6 / 4000 | 43.1 / 6250 | 51.7 / 7500 | 27.6 / 4000 | | 5.5 / 800 |
| 5/8 | 19.0 / 2750 | | | | 27.6 / 4000 | | 5.5 / 800 |
| 3/4 | 15.5 / 2250 | 20.7 / 3000 | 34.5 / 5000 | 43.1 / 6250 | 27.6 / 4000 | 34.5 / 5000 | 5.5 / 800 |
| 7/8 | | | | | | | 5.5 / 800 |
| 1 | 13.8 / 2000 | 20.7 / 3000 | 27.6 / 4000 | 34.5 / 5000 | 27.6 / 4000 | 34.5 / 5000 | 5.5 / 800 |
| 1 1/8 | | | | | | | 4.1 / 600 |
| 1 1/4 | | 17.2 / 2500 | 20.7 / 3000 | 24.1 / 3500 | 20.7 / 3000 | 34.5 / 5000 | |
| 1 3/8 | | | | | | | |
| 1 1/2 | | 13.8 / 2000 | 17.2 / 2500 | 20.7 / 3000 | 17.2 / 2500 | 34.5 / 5000 | |

TABLE 1b-continued

SUMMARY OF SAE J517 100R-SERIES HOSE
MAXIMUM OPERATING PRESSURE $$\frac{\text{MPa}}{\text{PSI}}$$

| Nominal Hose I.D. Size, in | 100R8 | 100R9 | 100R10 | 100R11 | 100R12 | 100R13 | 100R14 |
|---|---|---|---|---|---|---|---|
| 1 13/16 | | | | | | | |
| 2 | | 13.8/2000 | 17.2/2500 | 20.7/3000 | 17.2/2500 | 34.5/5000 | |
| 2 3/8 | | | | | | | |
| 2 1/2 | | | | | 17.2/2500 | | |
| 3 | | | | | | | |
| 4 | | | | | | | |

TABLE 2a

SUMMARY OF SAE J517 100R-SERIES HOSE
MINIMUM BURST PRESSURE $$\frac{\text{MPa}}{\text{PSI}}$$

| Nominal Hose I.D. Size, in | 100R1 | 100R2 | 100R3 | 100R4 | 100R5 | 100R6 | 100R7 |
|---|---|---|---|---|---|---|---|
| 1/8 | | | | | | | |
| 3/16 | 82.7/12000 | 137.9/20000 | 41.4/6000 | | 82.7/12000 | 13.8/2000 | 82.7/12000 |
| 1/4 | 75.8/11000 | 137.9/20000 | 34.5/5000 | | 82.7/12000 | 11.0/1600 | 75.8/11000 |
| 5/16 | 68.9/10000 | 117.2/17000 | 33.1/4800 | | 62.0/9000 | 11.0/1600 | 68.9/10000 |
| 3/8 | 62.0/9000 | 110.3/16000 | 31.0/4500 | | | 11.0/1600 | 62.0/9000 |
| 13/32 | 62.0/9000 | | | | 55.2/8000 | | |
| 1/2 | 55.2/8000 | 96.5/14000 | 27.6/4000 | | 48.3/7000 | 11.0/1600 | 55.2/8000 |
| 5/8 | 41.4/6000 | 75.8/11000 | 24.1/3500 | | 41.4/6000 | 9.7/1400 | 41.4/6000 |
| 3/4 | 34.5/5000 | 62.0/9000 | 20.7/3000 | 8.3/1200 | | 8.3/1300 | 34.5/5000 |
| 7/8 | 31.0/4500 | 55.2/8000 | | | 22.1/3200 | | |
| 1 | 27.6/4000 | 55.2/8000 | 15.5/2250 | 6.9/1000 | | | 27.6/4000 |
| 1 1/8 | | | | | 17.2/2500 | | |

TABLE 2a-continued

SUMMARY OF SAE J517 100R-SERIES HOSE
MINIMUM BURST PRESSURE $$\frac{\text{MPa}}{\text{PSI}}$$

| Nominal Hose I.D. Size, in | 100R1 | 100R2 | 100R3 | 100R4 | 100R5 | 100R6 | 100R7 |
|---|---|---|---|---|---|---|---|
| 1¼ | 17.2 / 2500 | 44.8 / 6500 | 10.3 / 1500 | 5.5 / 800 | | | |
| 1⅜ | | | | | 13.8 / 2000 | | |
| 1½ | 13.8 / 2000 | 34.5 / 5000 | | 4.1 / 600 | | | |
| 1¹³⁄₁₆ | | | | | 9.7 / 1400 | | |
| 2 | 10.3 / 1500 | 31.0 / 4500 | | 2.8 / 400 | | | |
| 2⅜ | | | | | 9.7 / 1400 | | |
| 2½ | | 27.6 / 4000 | | 1.7 / 250 | | | |
| 3 | | | | 1.5 / 225 | 5.5 / 800 | | |
| 4 | | | | 1.0 / 140 | | | |

TABLE 2b

SUMMARY OF SAE J517 100R-SERIES HOSE
MINIMUM BURST PRESSURE $$\frac{\text{MPa}}{\text{PSI}}$$

| Nominal Hose I.D. Size, in | 100R8 | 100R9 | 100R10 | 100R11 | 100R12 | 100R13 | 100R14 |
|---|---|---|---|---|---|---|---|
| ⅛ | | | | | | | 82.7 / 12000 |
| ³⁄₁₆ | 132.9 / 20000 | | 275.8 / 40000 | 344.7 / 50000 | | | 68.9 / 10000 |
| ¼ | 132.9 / 20000 | | 241.3 / 35000 | 310.3 / 45000 | | | 62.0 / 9000 |
| ⁵⁄₁₆ | | | | | | | 55.2 / 8000 |
| ⅜ | 110.3 / 16000 | 124.1 / 18000 | 206.8 / 30000 | 275.8 / 40000 | 110.3 / 16000 | | 48.3 / 7000 |
| ¹³⁄₃₂ | | | | | | | 41.4 / 6000 |

TABLE 2b-continued

SUMMARY OF SAE J517 100R-SERIES HOSE
MINIMUM BURST PRESSURE $$\frac{\text{MPa}}{\text{PSI}}$$

| Nominal Hose I.D. Size, in | 100R8 | 100R9 | 100R10 | 100R11 | 100R12 | 100R13 | 100R14 |
|---|---|---|---|---|---|---|---|
| ½ | 96.5/14000 | 110.3/16000 | 172.4/25000 | 206.8/30000 | 110.3/16000 | | 41.4/6000 |
| ⅝ | 75.8/11000 | | | | 110.3/16000 | | 34.5/5000 |
| ¾ | 62.0/9000 | 82.7/12000 | 137.9/20000 | 172.4/25000 | 110.3/16000 | 137.9/20000 | 27.6/4000 |
| ⅞ | | | | | | | 24.1/3500 |
| 1 | 55.2/8000 | 82.7/12000 | 110.3/16000 | 137.9/20000 | 110.3/16000 | 137.9/20000 | 24.1/3500 |
| 1⅛ | | | | | | | 17.2/2500 |
| 1¼ | | 68.9/10000 | 82.7/12000 | 96.5/14000 | 82.7/12000 | 137.9/20000 | |
| 1⅜ | | | | | | | |
| 1½ | | 55.2/8000 | 68.9/10000 | 82.7/12000 | 68.9/10000 | 137.9/20000 | |
| 1¹³⁄₁₆ | | | | | | | |
| 2 | | 55.2/8000 | 68.9/10000 | 82.7/12000 | 68.9/10000 | 137.9/20000 | |
| 2⅜ | | | | | | | |
| 2½ | | | | 68.9/10000 | | | |
| 3 | | | | | | | |
| 4 | | | | | | | |

TABLE 3a

SUMMARY OF SAE J517 100R-SERIES HOSE
PROOF PRESSURE $$\frac{\text{MPa}}{\text{PSI}}$$

| Nominal Hose I.D. Size, in | 100R1 | 100R2 | 100R3 | 100R4 | 100R5 | 100R6 | 100R7 |
|---|---|---|---|---|---|---|---|
| ⅛ | | | | | | | |
| ³⁄₁₆ | 41.7/10000 | 68.9/10000 | 20.7/3000 | | 41.4/6000 | 6.9/1000 | 41.4/6000 |
| ¼ | 37.9/5500 | 68.9/10000 | 17.2/2500 | | 41.4/6000 | 5.5/800 | 37.9/5500 |
| ⁵⁄₁₆ | 34.5/5000 | 58.6/8500 | 16.5/2400 | | 31.0/4500 | 5.5/800 | 34.5/5000 |

TABLE 3a-continued

SUMMARY OF SAE J517 100R-SERIES HOSE PROOF PRESSURE $$\frac{\text{MPa}}{\text{PSI}}$$

| Nominal Hose I.D. Size, in | 100R1 | 100R2 | 100R3 | 100R4 | 100R5 | 100R6 | 100R7 |
|---|---|---|---|---|---|---|---|
| 3/8 | 31.0/4500 | 55.2/8000 | 15.5/2250 | | | 5.5/800 | 31.0/4500 |
| 13/32 | 31.0/4500 | | | | 27.6/4000 | | |
| 1/2 | 27.6/4000 | 48.3/7000 | 13.7/2000 | | 24.1/3500 | 5.5/800 | 27.6/4000 |
| 5/8 | 20.7/3000 | 37.9/5500 | 12.1/1750 | | 20.7/3000 | 4.8/700 | 20.7/3000 |
| 3/4 | 17.2/2500 | 31.0/4500 | 10.3/1500 | 4.1/600 | | 4.1/600 | 17.2/2500 |
| 7/8 | 15.5/2250 | 27.6/4000 | | 11.0/1600 | | | |
| 1 | 13.8/2000 | 27.0/4000 | 7.8/1125 | 3.4/500 | | | 13.8/2000 |
| 1 1/8 | | | | 8.6/1250 | | | |
| 1 1/4 | 8.6/1250 | 22.4/3250 | 5.2/750 | 2.8/400 | | | |
| 1 3/8 | | | | 6.9/1000 | | | |
| 1 1/2 | 6.9/1000 | 17.2/2500 | | 2.1/300 | | | |
| 1 13/16 | | | | 4.8/700 | | | |
| 2 | 5.2/750 | 15.5/2250 | | 1.4/200 | | | |
| 2 3/8 | | | | 4.8/700 | | | |
| 2 1/2 | | 13.8/2000 | | 0.9/125 | | | |
| 3 | | | | 0.8/112 | 2.7/400 | | |
| 4 | | | | 0.5/70 | | | |

TABLE 3b

SUMMARY OF SAE J517 100R-SERIES PROOF PRESSURE $$\frac{\text{MPa}}{\text{PSI}}$$

| Nominal Hose I.D. Size, in | 100R8 | 100R9 | 100R10 | 100R11 | 100R12 | 100R13 | 100R14 |
|---|---|---|---|---|---|---|---|
| 1/8 | | | | | | | 41.4 / 6000 |
| 3/16 | 68.9 / 10000 | | 137.9 / 20000 | 172.4 / 25000 | | | 34.5 / 5000 |
| 1/4 | 68.9 / 10000 | | 120.6 / 17500 | 155.1 / 22500 | | | 31.0 / 4500 |
| 5/16 | | | | | | | 27.6 / 4000 |
| 3/8 | 55.2 / 8000 | 62.0 / 9000 | 103.4 / 15000 | 137.9 / 20000 | 55.2 / 8000 | | 24.1 / 3500 |
| 13/32 | | | | | | | 20.7 / 3000 |
| 1/2 | 48.3 / 7000 | 55.2 / 8000 | 86.2 / 12500 | 103.4 / 1500 | 55.2 / 8000 | | 20.7 / 3000 |
| 5/8 | 37.9 / 5500 | | | | 55.2 / 8000 | | 17.2 / 2500 |
| 3/4 | 31.0 / 4500 | 41.4 / 6000 | 68.9 / 10000 | 86.2 / 12500 | 55.2 / 8000 | 69.0 / 10000 | 13.8 / 2000 |
| 7/8 | | | | | | | 12.1 / 1750 |
| 1 | 27.6 / 4000 | 41.4 / 6000 | 55.2 / 8000 | 68.9 / 10000 | 55.2 / 8000 | 69.0 / 10000 | 12.1 / 1750 |
| 1 1/8 | | | | | | | 8.6 / 1250 |
| 1 1/4 | | 34.5 / 5000 | 41.4 / 6000 | 48.3 / 7000 | 13.8 / 2000 | 69.0 / 10000 | |
| 1 3/8 | | | | | | | |
| 1 1/2 | | 27.6 / 4000 | 34.5 / 5000 | 41.4 / 6000 | 34.5 / 5000 | 69.0 / 10000 | |
| 1 13/16 2 | | 27.6 / 4000 | 34.5 / 5000 | 41.4 / 6000 | 34.5 / 5000 | 69.0 / 10000 | |
| 2 3/8 | | | | | | | |
| 2 1/2 | | | | 34.5 / 5000 | | | |
| 3 | | | | | | | |
| 4 | | | | | | | |

Example 15

Heavy-Duty, High Impulse, Multiple Spiral Wire Reinforced, Rubber Covered Hydraulic Hose (SAE 100R15). A hose for use with petroleum base fluids within a temperature range of −40 to +121° C. A hose in accordance with this example can have an inner tube of oil-resistant rubber, multiple spiral plies of heavy wire wrapped in alternating directions and an oil- and weather-resistant synthetic rubber cover. A ply or braid of suitable material may be used over or within the inner tube and/or over the wire reinforcement to anchor a synthetic rubber to the wire. Performance specifications for each nominal SAE 100R15 hose ID size (⅜, 1/2, 3/4, 1, 1-¼ and 1-½ inch): minimum burst pressure, 165.5/24,000 (MPa/psi); proof pressure, 82.7/12,000 (MPa/psi); maximum operating pressure, 41.4/6,000 (MPa/psi).

Example 16

High-Pressure, Steel Wire Reinforced, Rubber Covered Hydraulic Hose (SAE 100R16). A hose for use with petroleum- and water-base hydraulic fluids within a temperature range of −40 to +100° C. A hose in accordance with the example as an inner tube of oil-resistant synthetic rubber, steel wire reinforcement according to hose design (one or two braids) and an oil- and weather-resistant synthetic rubber cover. A ply or braid of suitable material may be used over the inner tube and/or over the wire reinforcement to anchor the synthetic rubber to the wire. Various performance specifications for such a hose are as provided below.

| Nomial SAE 100R16 Hose ID Size, mm | Min Burst Pressure MPa | Proof Pressure MPa | Max Operating Pressure MPa |
|---|---|---|---|
| 6.4 | 137.9 | 69.0 | 34.5 |
| 7.9 | 117.2 | 58.6 | 29.3 |
| 9.5 | 110.3 | 55.2 | 27.6 |
| 12.7 | 96.5 | 48.3 | 24.1 |
| 15.9 | 75.8 | 37.9 | 19.0 |
| 19.0 | 62.0 | 31.0 | 15.5 |
| 25.4 | 55.2 | 27.6 | 13.8 |
| 31.8 | 44.8 | 22.4 | 11.2 |

Example 17

Compact 21 MPa Maximum Operating Pressure One and Two Steel Wire Reinforced Rubber Covered Hydraulic Hose With Smaller Bend Radius (SAE 100R17). Hoses of this type are smaller in diameter than one and two braid hoses with similar performance characteristics specified in SAE 100R1 and 100R2 which gives them the ability to operate at smaller bend radii. They are also lighter in weight and their compactness offers advantages when minimal space is available in installations. This hose can be manufactured as either a one braid or two braid design and is identified as to the number of braids. A hose in accordance with this example can have an inner tube of oil resistant elastomer, steel wire reinforcement according to hose design (one or two braids), and an oil- and weather-resistant elastomeric cover. A ply or braid of suitable material may be used over the inner tube and/or over the wire reinforcement to anchor the elastomer. A hose of this sort has a nominal internal diameter from about 6.3 mm to 25.0 mm, for use with refined petroleum based hydraulic fluids, at temperatures ranging from −40° C. to 100° C. Such a hose is not suitable for use with castro oil based and ester based fluids. Various performance specifications for such a hose are as provided below.

| ISO Nominal ID mm | Min Burst Pressure MPa | Proof Pressure MPa | Max Operating Pressure MPa |
|---|---|---|---|
| 6.3 | 84.0 | 42.0 | 21.0 |
| 8 | 84.0 | 42.0 | 21.0 |
| 10 | 84.0 | 42.0 | 21.0 |
| 12.5 | 84.0 | 42.0 | 21.0 |
| 16 | 84.0 | 42.0 | 21.0 |
| 19 | 84.0 | 42.0 | 21.0 |
| 25 | 84.0 | 42.0 | 21.0 |

Examples 18–27 illustrate hose fittings in accordance with this invention and of the type which can be used in conjunction with the hoses and/or assemblies described herein.

Example 18

The hydroformed hydraulic hose fitting of this example is a male dry seal type thread tight fitting which can be used with a variety of compatible hoses, including those meeting the dimensional, design and performance specifications for SAE 100R1–100R13 hydraulic hoses, as well-known to those skilled in the art and more fully described in SAE Standard Specifications J517. Such a fitting can be of the (a) permanently attached, (b) field attachable screw, or (c) field attachable segment clamp style, each of which is more fully described by way of design and dimensional specifications in SAE Standard Specification J516.

Example 19

The hydroformed hydraulic hose fitting of this example is a male straight thread O-ring boss type fitting which can be used with a variety of compatible hoses, including those meeting the dimensional, design and performance specifications for SAE 100R1, R2, R5, R7–R10 and 100R12 hydraulic hoses, as well-know to those skilled in the art and more fully described in SAE Standard Specification J517. Such a fitting can be of the (a) permanently attached or (b) field attachable screw style, each of which is more fully described by way of design and dimensional specifications in SAE Standard Specification J516.

Example 20

The hydroformed hydraulic hose fitting of this example is a male 37 degree flared type fitting which can be used with a variety of compatible hoses, including those meeting the dimensional, design and performance specifications for SAE 100R1–100R10, 100R12 and 100R13 hydraulic hoses, as well-known to those skilled in the art and more fully described in SAE Standard Specification J517. Such a fitting can be of the (a) permanently attached, (b) field attachable screw or (c) field attachable segment clamp style, each of which is more fully described by way of design and the dimensional specifications in SAE Standard Specification J516.

Example 21

The hydroformed hydraulic hose fitting of this example is a female 37 degree flared type fitting which can be used with a variety of compatible hoses, including those meeting the dimensional, design and performance specifications for SAE 100R1–100R13 hydraulic hoses, as well-known to those skilled in the art and more fully described in SAE Standard Specification J517. Such a fitting can be of the (a) permanently attached, (b) field attachable screw, or (c) field attachable segment clamp, (d) option 37 degree radio flare swivel end-45 degree angle, (e) permanently attached with sleeve-45 degree angle, (e) field attachable screw-45 degree angle, (f) permanently attached-90 degree angle short drop, (g) field attachable screw-90 degree angle short drop, (h) permanently attached-90 degree angle long drop, and field attachable screw style-90 degree angle long drop, each of which is more fully described by way of design and dimensional specifications in SAE Standard Specification J516.

Example 22

The hydroformed hydraulic hose fitting of this example is a male 45 degree flared type fitting which can be used with a variety of compatible hoses, including those meeting the dimensional, design and performance specifications for SAE 100R1, 100R3 and 100R5–100R7 hydraulic hoses, as well-known to those skilled in the art and more fully described in SAE Standard Specification J517. Such a fitting can be of the (a) permanently attached or (b) field attachable screw style, each of which is more fully described by way of design and dimensional specifications in SAE Standard Specification J516.

Example 23

The hydroformed hydraulic hose fitting of this example is a female 45 degree flared type fitting which can be used with a variety of compatible hoses, including those meeting the dimensional, design and performance specifications for SAE 100R1, 100R3, 100R5–100R7 hydraulic hoses, as well-known to those skilled in the art and more fully described in SAE Standard Specification J517. Such a fitting can be of the (a) permanently attached, (b) field attachable screw, (c) permanently attached-45 degree angle, (d) field attachable screw-45 degree angle, (e) permanently attached-90 degree angle short drop, (f) field attachable screw-90 degree angle short drop, (g) permanently attached-90 degree angle long drop and (h) field attachable screw-90 degree angle long drop style, each of which is more fully described by way of design and dimensional specifications in SAE Standard Specification J516.

Example 24

The hydroformed hydraulic hose fitting of this example is a male flareless type fitting which can be used with a variety of compatible hoses, including those meeting the dimensional, design and performance specifications for SAE 100R1 and 100R2 hydraulic hoses, as well-known to those skilled in the art and more fully described in SAE Standard Specification J517. Such a fitting can be of the (a) permanently attached or (b) field attachable screw style, each of which is more fully described by way of design and dimensional specifications in SAE Standard Specification J516.

Example 25

The hydroformed hydraulic hose fitting of this example is a female flareless type fitting which can be used with a variety of compatible hoses, including those meeting the dimensional, design and performance specifications for SAE 100R1 and 100R2 hydraulic hoses, as well-known to those skilled in the art and more fully described in SAE Standard Specification J517. Such a fitting can be of the (a) optional preset ferrule end construction, (b) permanently attached or (c) field attachable screw style, each of which is more fully described by way of design and dimensional specifications in SAE Standard Specification J516.

Example 26

The hydroformed hydraulic hose fitting of this example is a 4-bolt split flange type fitting which can be used with a variety of compatible hoses, including those meeting the dimensional, design and performance specifications for SAE 100R1, 100R2, 100R4, 100R5 and 100R9–100R12 hydraulic hoses, as well-known to those skilled in the art and more fully described in SAE Standard Specification J517. Such a fitting can be of the (a) permanently attached, (b) field attachable screw, (c) field attachable segment clamp, (d) permanently attached-22.5 degree angle, (e) field attachable screw-22.5 degree angle, (f) field attachable segment clamp-22.5 degree angle, (g) permanently attached-30 degree angle, (h) field attachable screw-30 degree angle, (i) field attachable segment clamp-30 degree angle, (j) permanently attached-45 degree angle, (k) field attachable screw-45 degree angle, (l) field attachable segment clamp-45 degree angle, (m) permanently attached-60 degree angle, (n) field attachable screw-60 degree angle, (o) field attachable segment clamp-60 degree angle, (p) permanently attached-67.5 degree angle, (q) field attachable screw-67.5 degree angle, (r) field attachable segment clamp-67.5 degree angle, (s) permanently attached-90 degree angle, (t) field attachable screw-90 degree angle and (u) field attachable segment clamp-90 degree angle style, each of which is more fully described by way of design and dimensional specifications in SAE Standard Specification J516.

Example 27

The hydroformed hydraulic hose fitting of this example is a female O-ring face seal type fitting which can be used with a variety of compatible hoses, including those meeting the dimensional, design and performance specifications for SAE 100R1 and 100R12 hydraulic hoses, as well-known to those skilled in the art and more fully described in SAE Standard Specification J517. Such a fitting can be of the (a) permanently attached, (b) field attachable screw, (c) permanently attached-45 degree angle, (d) field attachable screw-45 degree angle, (e) permanently attached-90 degree short drop angle, (f) field attachable screw-90 degree short drop angle, (g) permanently attached-90 degree long drop and (h) field attachable screw-90 degree long drop style, each of which is more fully described by way of design and dimensional specifications in SAE Standard Specification J516.

While the principles of this invention have been described in connection with specific embodiments, it should be understood clearly that these descriptions, along with the chosen examples, figures, tables and data contained therein, are made only by way of illustration and are not intended to limit the scope of this invention in any manner. For instance, the systems and methods of this invention can be adapted in a straightforward manner to provide for the manufacture of fuel/oil hose fittings and assemblies, in accordance with SAE standard J30. Likewise, while various dimensional, design and performance specifications have been referenced in conjunction with the SAE standards, the present invention has equal applicability with respect to any corresponding international specifications employed industrially in other jurisdictions, which can be met with equal effect and are to be considered with the present invention. Other advantages and features of the invention will become apparent from the following claims, with the scope thereof determined by a reasonable equivalents, as understood by those skilled in the art.

In the claims:

1. A hydraulic hose fitting comprising hydroformed metal, said fitting substantially without brazing and without a machine line, said fitting having a unitary, one-piece configuration, said fitting including two raised portions having a recess therebetween and a plurality of barbs thereon, said barbs selected from the group consisting of circumferential edges, squares and combinations thereof.

2. The hydraulic hose fitting of claim 1 wherein said fitting has a uniform wall thickness dimension.

3. The hose fitting of claim 1 wherein said barbs are a plurality of circumferential edges.

4. The hydraulic hose fitting of claim 1 wherein said fitting is a female 37-degree flared fitting.

5. A hydraulic hose assembly comprising a unitary hose fitting of hydroformed metal, said fitting including two raised portions having a recess therebetween and a plurality of barbs thereon, said barbs selected from the group consisting of circumferential edges, squares and combinations thereof, said fitting further configured to meet SAE J516 standard specifications for hydraulic hose fittings; a hydraulic fluid hose functionally and dimensionally compatible with said hose fitting; and a mechanism securing said hose to said fitting, said mechanism having a mating relationship with said two raised portions, said mechanism on said hose and contacting said hose across and between each of said barbs.

6. The assembly of claim 5 wherein said barbs are a plurality of circumferential edges.

7. The assembly of claim 6 wherein said mechanism is a ferrule.

8. The assembly of claim 5 wherein said compatibility of said hose and said hose fitting is in accordance with SAE recommended practice J1273.

9. The assembly of claim 5 wherein said hose fitting has a uniform wall thickness dimension.

* * * * *